(No Model.) 3 Sheets—Sheet 1.

L. D. & P. W. MILLER.
MEASURING PUMP.

No. 358,162. Patented Feb. 22, 1887.

WITNESSES
Jas. B. Clark
F. E. Myers

INVENTORS
L. D. Miller
P. W. Miller
by E. H. Bates
Attorney (No Model.) 3 Sheets—Sheet 2.

L. D. & P. W. MILLER.
MEASURING PUMP.

No. 358,162. Patented Feb. 22, 1887.

WITNESSES
Jas. B. Clark
F. E. Myers

INVENTORS.
L. D. Miller
P. W. Miller
by E. H. Bates
Attorney

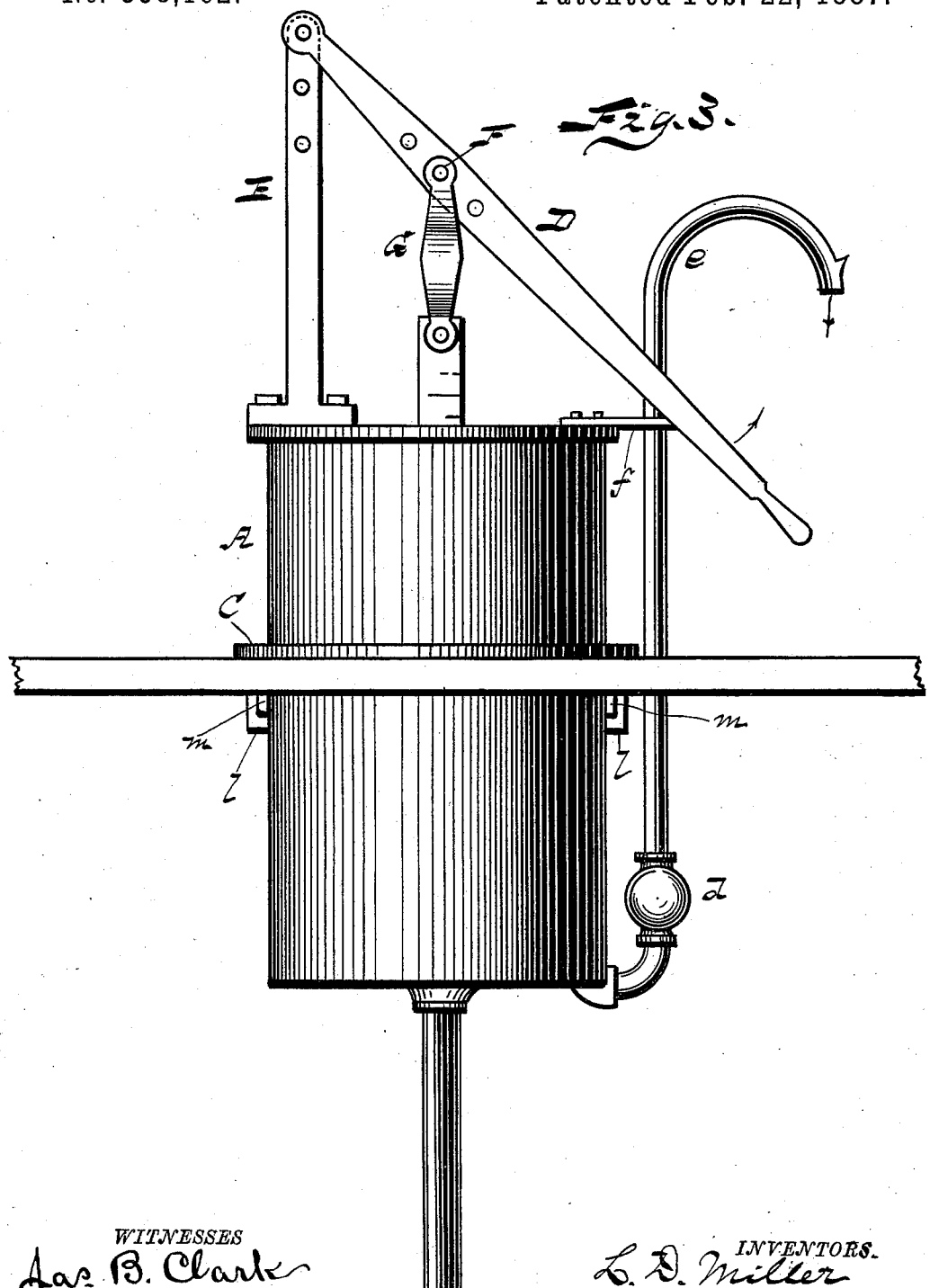

UNITED STATES PATENT OFFICE.

LEMUEL D. MILLER AND PHILIP W. MILLER, OF COLLAMER, PA.

MEASURING-PUMP.

SPECIFICATION forming part of Letters Patent No. 358,162, dated February 22, 1887.

Application filed October 29, 1886. Serial No. 217,515. (No model.)

*To all whom it may concern:*

Be it known that we, LEMUEL D. MILLER and PHILIP W. MILLER, both citizens of the United States, residing at Collamer, in the county of Chester and State of Pennsylvania, have invented certain new and useful Improvements in Measuring-Vessels; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in devices for measuring liquids; and it consists in the novel construction and arrangement of parts, as will be hereinafter more fully explained, and particularly pointed out in the appended claims.

Figure 1:
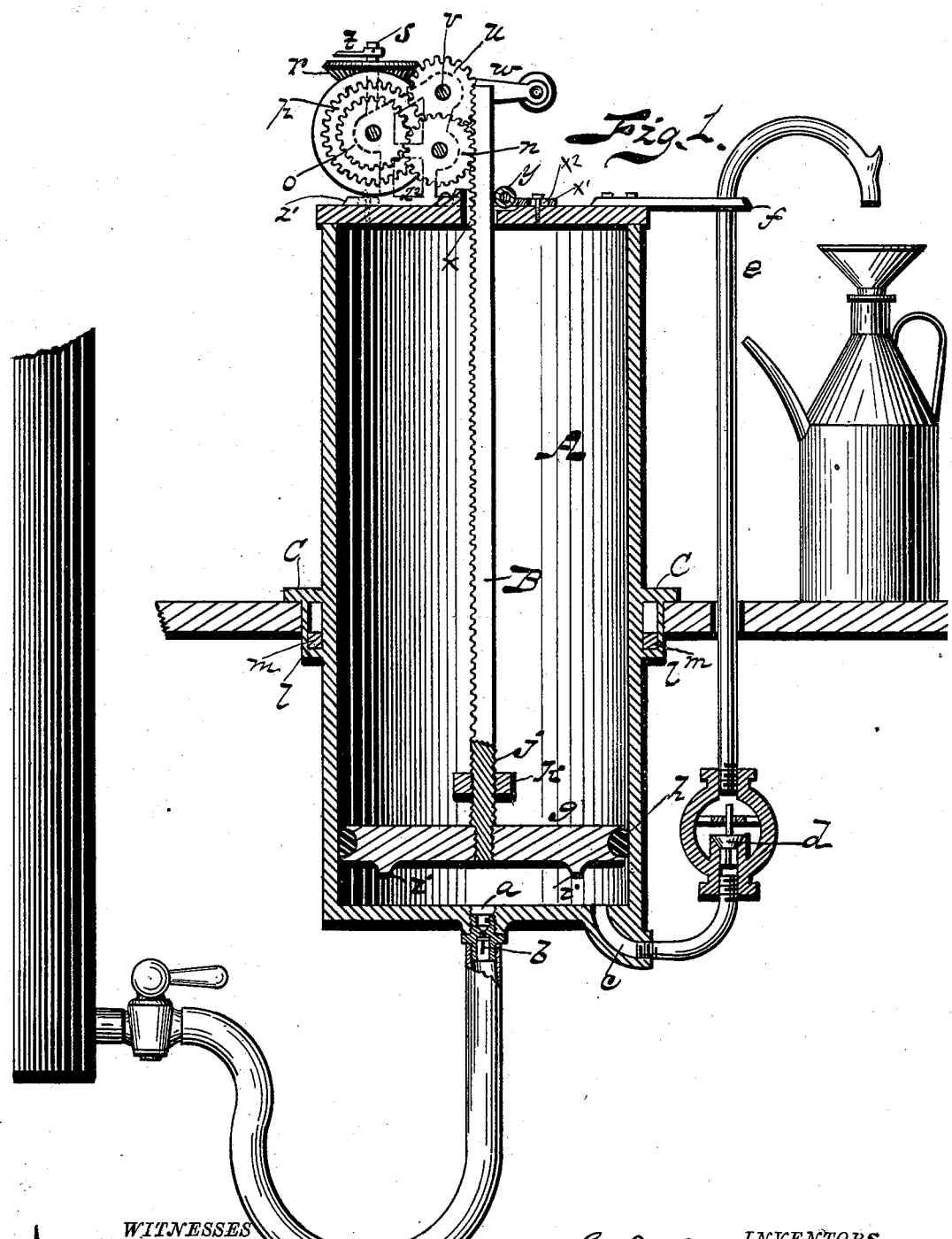
Figure 2:
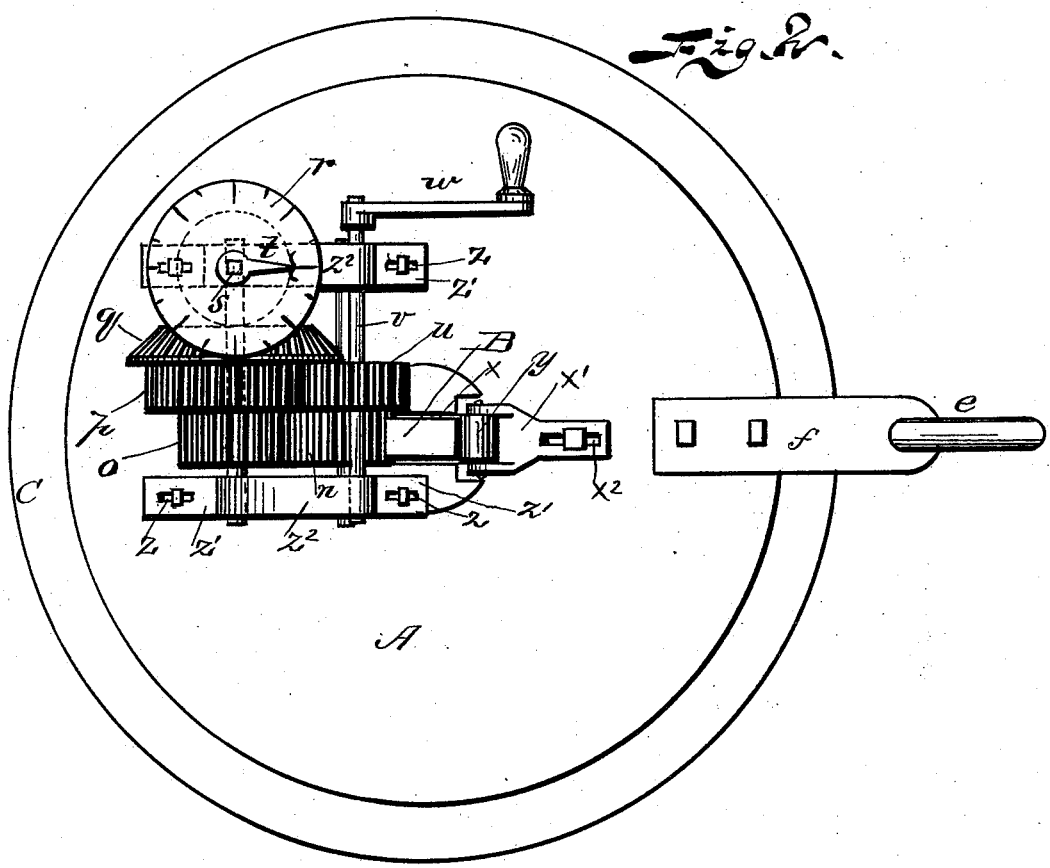

Referring to the annexed drawings, Figure 1 represents a vertical sectional view of our device. Fig. 2 is a top or plan view of the same; and Fig. 3 is a modification of our device.

In the drawings, A designates the vessel, which is of cylindrical form and may have the capacity of one gallon, more or less, according to the size of the same. At the bottom of this vessel an opening, $a$, is provided, having female screw-threads, in which is inserted a pipe or hose coupling having a check-valve, $b$, and to which coupling the hose is attached, which leads the liquid from the tank or barrel, situated at any suitable point. This vessel is further provided with an outlet, $c$, to which is connected a check-valve, $d$, from the upper end of which extends the discharge-pipe $e$, that is supported in position by an arm, $f$, secured to the cover of the vessel. Within the cylinder is arranged the piston $g$, which is provided with suitable packing, $h$, whereby the same is caused to fit the interior of said cylinder snugly, and feet or projections $i$ are formed on the lower side of said piston, whereby the same is prevented from touching the bottom of the vessel.

B represents a rack-bar, which is secured at its lower end to the piston and is screw-threaded, as at $j$, to receive a gaging-nut, $k$, which is designed to regulate the quantity of liquid to a given measure should there be a variation in the wear of the operating parts or size of the vessel.

C indicates a flange, having loops $l$, which are designed to receive a wedge, $m$, below the support or table, as shown, or the flange may be perforated to receive screws, whereby said vessel can be rigidly held in place. In combination with the rack-bar we provide suitable gearing, which consists of a pinion, $n$, that meshes with the teeth of the rack-bar, and said pinion in turn engages a second pinion, $o$, which is made integral with a cog-wheel, $p$, having on one side a bevel-gear, $q$, that engages a similar single bevel gear-wheel, $r$, journaled on a vertical shaft, $s$, secured to the lid of the vessel. This post or shaft $s$ is provided with a pointer, $t$, and the wheel $r$ has on its upper or smooth face graduating-marks whereby the amount of liquid is determined when measuring.

The pinion $u$ on the shaft $v$ engages the gear-wheel $p$, and a handle, $w$, is secured to the outer end of said shaft, whereby, when said handle is operated, motion is given to the pinion $u$, thus turning the wheel $p$, which transmits motion to the remaining gears, thus raising the rack-bar by the pinion $n$, which latter and the train of gearing are journaled in suitable supports on the lid of the vessel. The slot $z$ in the feet $z'$ serves to adjust the support $z^2$ toward or from the rack-bar B, thus taking up, when moved toward it, any wear on the wheel $n$, thereby keeping the latter snugly engaged with the teeth of the rack-bar. The rack-bar passes through an opening, $x$, in the lid, and in rear of said bar is adjustably journaled an anti-friction roller, $y$, which bears against the rear of said bar and relieves it from friction by coming in contact with the opening in the lid, thus providing an easy movement to said bar, the bar $x'$ being slotted at $x^2$ for said adjustment.

It will thus be seen by the above description and by reference to the annexed drawings that when the handle is turned motion is imparted to the train of gearing. At the same time the plunger is raised, the valve $d$ is closed, and the liquid is drawn from the tank (which may be below the vessel, thus drawing the liquid up) into the vessel. At the same time the pointer $t$ registers the amount drawn therein by the gage-marks on the bevel-wheel $r$; and when sufficient quantity is drawn within the vessel the handle is reversed and the gearing given a reverse movement, thereby lowering the plunger, at same time shutting or closing the check-valve $b$ and opening the valve $d$ and forcing the liquid which has been measured out the pipe $e$ into a receptacle, when the same operation is repeated as above stated, and any quantity of liquid can be measured before leaving the vessel; and the gage-nut $k$ on the lower end of the rack-bar serves to compensate for any variations in the construction of the cylinder or for wear of rack and gearing. At the same time it is simple in operation, durable, and cheap to manufacture.

In Fig. 3 we show a modification of our device in the form of a pitman and lever arranged on top of the lid of the vessel, whereby the plunger-rod is raised and lowered. Said modification consists of the hand-lever D, which is pivoted to the post E, secured to the top of the lid, and pivoted at F to said lever is a connecting-link, G, which in turn is pivoted at its lower end to the top of the plunger-rod, as shown. Thus, by the operation of said lever, the plunger is caused to raise and draw the liquid within the vessel and discharge it therefrom when lowered.

We do not wish to confine ourselves to the exact construction and arrangement of the lever-operating parts, as various changes can be made in its construction and its arrangement without departing from the spirit of our invention.

Having described our invention, what we claim, and desire to secure by Letters Patent, is—

1. In a measuring-vessel, the combination of the rack-bar carrying the plunger and provided with the screw-threads, the nut $k$, adapted to operate as set forth, the discharge-pipe $e$, provided with the check-valve $d$, the anti-friction roller $y$, and train of gearing $n$, $o$, $p$, $q$, $u$, and $r$, handle $w$, and pointer $t$, the whole adapted to operate as shown, and for the purpose set forth.

2. The adjustable support $z^2$ and adjustable roller $y$, in combination with the gearing, as shown and described.

3. The combination, with the rack-bar carrying the plunger, of the train of gearing, consisting of the wheels $n$ $o$ $p$ $u$, bevel-gears $q$ and $r$, the latter provided with gage-marks for the pointer $t$, the frame $z^2$, having the standard $s$, and the handle $w$, the whole adapted to operate as and for the purpose set forth.

In testimony whereof we affix our signatures in presence of two witnesses.

LEMUEL D. MILLER.
PHILIP W. MILLER.

Witnesses:
GEO. W. MIXTER,
JOHN N. WALKER.